United States Patent
Aiba et al.

(10) Patent No.: US 9,029,769 B2
(45) Date of Patent: May 12, 2015

(54) DOSE RATE MEASURING APPARATUS

(75) Inventors: Toshihide Aiba, Chiyoda-ku (JP); Kenichi Moteki, Osaka (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 80 days.

(21) Appl. No.: 13/604,232

(22) Filed: Sep. 5, 2012

(65) Prior Publication Data

US 2013/0284926 A1    Oct. 31, 2013

(30) Foreign Application Priority Data

Apr. 26, 2012 (JP) .................................. 2012-100631

(51) Int. Cl.
   *G01T 1/00*    (2006.01)
   *G01T 1/178*   (2006.01)
   *G01T 3/08*    (2006.01)

(52) U.S. Cl.
   CPC .................. *G01T 1/178* (2013.01); *G01T 3/085* (2013.01)

(58) Field of Classification Search
   CPC ................................. G01T 3/001; G01T 1/178
   USPC ...................................................... 250/336.1
   See application file for complete search history.

(56) References Cited

U.S. PATENT DOCUMENTS 4,528,450 A * 7/1985 Valenta ........................... 250/362
6,184,531 B1 * 2/2001 Smart et al. ............... 250/370.01

FOREIGN PATENT DOCUMENTS

| JP | 02047581 A | * 2/1990 | ............... G01T 3/00 |
| JP | 10197639 A |   7/1998 | |
| JP | 2002022839 A | 1/2002 | |
| JP | 3304566 B2 | 7/2002 | |
| JP | 2008215907 A | 9/2008 | |
| JP | 2009-175042 A | 8/2009 | |

OTHER PUBLICATIONS

Japanese Office Action issued Feb. 3, 2015 in corresponding JP Application No. 2012-100631, with full English Translation (11 pages).

* cited by examiner

*Primary Examiner* — David Porta
*Assistant Examiner* — Edwin Gunberg
(74) *Attorney, Agent, or Firm* — Buchanan Ingersoll & Rooney PC (57) ABSTRACT

A radiation detector outputs an analog pulse for incident radiation, and a signal processing portion is furnished with a wave height measuring function of converting the analog pulse inputted therein to a digital form and then measuring a peak wave height of the analog pulse and a wave height spectrum measuring function of measuring a wave height spectrum on the basis of measured wave height data, computes a dose rate and mean energy on the basis of measured wave height spectral data, and outputs computation results. The signal processing portion computes the dose rate and the mean energy on the basis of the wave height spectral data in a same wave height range on a same time axis. It thus becomes possible to provide accurate information based on which to determine whether a rise in dose rate is contributed by natural radon and thoron or contributed by a reactor facility.

9 Claims, 8 Drawing Sheets

DOSE RATE MEASURING APPARATUS

BACKGROUND OF THE INVENTION

1. Field of the Invention

The present invention relates to a dose rate measuring apparatus introduced to an environmental radiation monitoring post or a portable monitoring post set up within a nuclear-related facility and in a surrounding area to measure a dose rate that is an amount of radiation per unit time.

2. Background Art

For a dose rate measuring apparatus in the related art, there are a G(E) function method and a DBM (Discrimination Biased Modulation) method as means for finding a dose rate or the like on the basis of a wave height of a detection pulse. According to the G(E) function method, an energy spectrum of radiation is obtained by an MCA (Multi-Channel Analyzer) and a dose rate is obtained by multiplying energy conversion factors (hereinafter, referred to as the G(E) functions) that are energy conversion factors corresponding to energy of respective channels of the obtained spectrum by the numbers of counts of the respective channels. According to the DBM method, a wave height discriminator that discriminates a wave height of a detection pulse is used and a probability that the detection pulse is inputted into a counter at a latter stage in the wave height discriminator is adjusted according to the wave height by temporally varying a discrimination threshold of the wave height discriminator in accordance with a predetermined pattern.

When a dose rate rises, a transmittance is found and a variance of the transmittance is used as information on the basis of which to determine whether a rise in dose rate is contributed by natural radon and thoron accompanying rainfall or snowfall or contributed by a reactor facility. A dose rate is found from a transmittance as follows. First, a transmittance is found by the G(E) function method by converting a mean dose rate per unit time, for example, one minute, to a count rate of γ rays of energy equivalent to 3 MeV and by dividing this count rate by a count rate of all the γ rays in a measurement range. Alternatively, a transmittance is found by dividing a count rate obtained by the DBM method by a count rate of all the γ rays in a measurement range. The transmittance thus found is subjected to processing in the MCA while maintaining a measurement time constant to obtain an energy spectrum of radiation. A dose rate is obtained by multiplying a conversion factor between a dose rate and energy corresponding to the energy of the spectrum by the numbers of counts of the respective channels of the MCA. For details, see Patent Document 1.

Patent Document 1: JP-A-2009-175042 (pp. 3 to 12, FIG. 4)

As has been described, according to the dose measuring apparatus in the related art, a dose rate is outputted together with a transmittance and the transmittance is used as information based on which to determine a cause of an indicated rise. However, there is a problem that a transmittance is indirect and difficult to understand in comparison with mean energy. Also, the G(E) function method and the DBM method in the related art have a problem in responsivity to an abrupt development of an event. Even when an improvement is made in the DBM method by adding an output that quickly responses to a rise in dose rate by holding a statistical error constant, information on a transmittance on the same time axis when the dose rate is measured is absent. Hence, a lack of information in an abrupt development of an event becomes a problem. Further, in a case where energy of radiation is low, a skipping ratio becomes higher in the DBM method. This poses a problem that resolution of a dose rate becomes rough or a count loss occurs when low-energy radiation comes in a burst.

SUMMARY OF THE INVENTION

The invention is devised to solve the problems discussed above and has an object to obtain a dose rate measuring apparatus capable of determining a variance in dose rate contributed by a reactor facility with a quick response and measuring a dose rate with high accuracy without deteriorating resolution of low energy.

A dose rate measuring apparatus according to a first aspect of the invention includes a radiation detector that outputs an analog pulse for incident radiation, and a signal processing portion that is furnished with a wave height measuring function of converting the analog pulse inputted thereinto a digital form and then measuring a peak wave height of the analog pulse and a wave height spectrum measuring function of measuring a wave height spectrum on the basis of measured wave height data, computes a dose rate and mean energy on the basis of measured wave height spectral data, and outputs computation results. The signal processing portion computes the dose rate and the mean energy on the basis of the wave height spectral data in a same wave height range on a same time axis.

Also, a dose rate measuring apparatus according to a second aspect of the invention includes a radiation detector that outputs an analog pulse for incident radiation, and a signal processing portion that is furnished with a wave height measuring function of converting the analog pulse inputted therein to a digital form and then measuring a peak wave height of the analog pulse and a wave height spectrum measuring function of measuring a wave height spectrum on the basis of measured wave height data, computes a dose rate, mean energy, and a count rate obtained by setting a window specific to descendant nuclides of radon and thoron on the basis of measured wave height spectral data, and outputs computation results. The signal processing portion computes the dose rate and the mean energy on the basis of the wave height spectral data in a same wave height range on a same time axis.

Each of the dose rate measuring apparatuses according to the first and second aspects includes the radiation detector that outputs an analog pulse for incident radiation, and the signal processing portion that is furnished with the wave height measuring function of measuring a peak wave height of the analog pulse and the wave height spectrum measuring function of measuring a wave height spectrum on the basis of the measured wave height data, computes a dose rate and mean energy on the basis of the measured wave height spectral data, and outputs computation results. It thus becomes possible to provide useful information on the basis of which to determine whether a rise in dose rate is contributed by natural radon and thoron accompanying rainfall or snowfall or contributed by a reactor facility. Consequently, it becomes possible to determine whether the monitoring level should be increased thereafter.

Also, the signal processing portion computes and outputs a dose rate $r_1$ and mean energy $e_1$, and finds accumulated radiation $\Sigma_2 \Delta R$ by adding up total radiation $\Delta R$ in past from the current computation period until an accumulated value reaches or exceeds set accumulated radiation, accumulated energy $\Sigma_2 \Delta E$ by adding up total energy $\Delta E$ in a same wave height range for an accumulation time $\Sigma_2 \Delta T$ back on a same time axis, and an accumulated count $\Sigma_2 \Delta N$ by adding up total count $\Delta N$ corresponding to the total energy in a same manner.

The processing portion then computes and outputs a dose rate $r_2=\Sigma_2\Delta R/\Sigma_2\Delta T$ and mean energy $e_2$ (average)$=\Sigma_2\Delta E/\Sigma_2\Delta N$. Accordingly, a dose rate can be measured accurately in a stable manner by maintaining a fluctuation substantially constant and the accumulation time $\Sigma_2\Delta T$ becomes shorter in inverse proportion to the dose rate $r_2$. It thus becomes possible to provide information on the mean energy $e_2$ (average) with a quick response to a rise in dose rate.

The foregoing and other objects features, aspects, and advantages of the present invention will become more apparent from the following detailed description of the present invention when taken conjunction with the accompanying drawings.

DESCRIPTION OF THE PREFERRED EMBODIMENTS

First Embodiment

Figure 1:
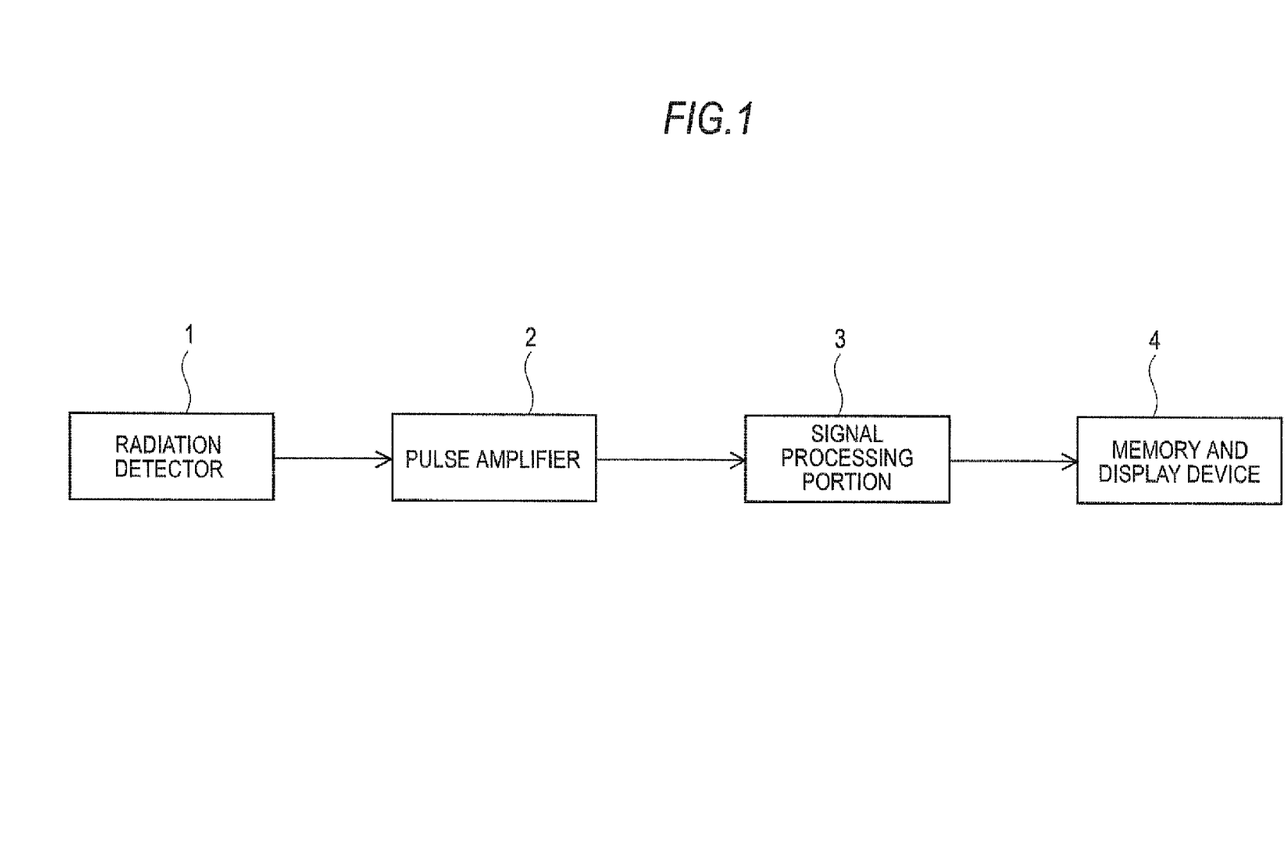
FIG. 1 is a block diagram of a dose rate measuring apparatus of the invention.

Hereinafter, a dose rate measuring apparatus according to a first embodiment of the invention will be described. The apparatus shown in FIG. 1 is used, for example, to measure environmental γ (or X) rays and formed of a radiation detector 1, a pulse amplifier 2, a signal processing portion 3, and a memory and display device 4. The radiation detector 1 absorbs incident radiation and outputs an analog pulse having a wave height corresponding to energy thereof. The analog pulse is first amplified and wave-shaped in the pulse amplifier 2 to be readily processed in the latter stage and then inputted into the signal processing portion 3. The signal processing portion 3 performs computation processing by converting the analog pulse inputted therein to a digital signal. The computation result is saved in a recording medium of the memory and display device 4 and displayed thereon.

Figure 2:
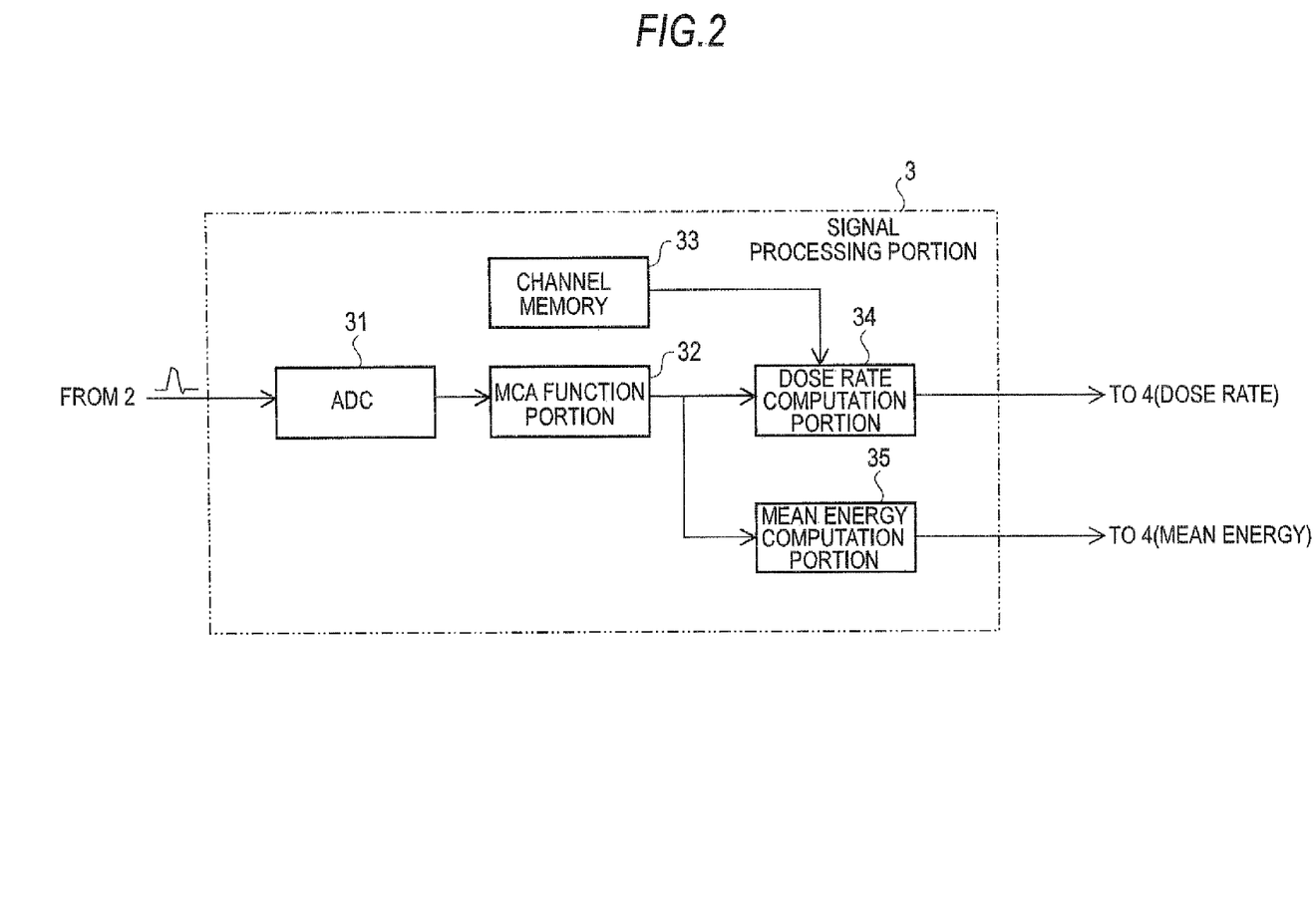
FIG. 2 is a block diagram of a signal processing portion of the dose rate measuring apparatus according to a first embodiment of the invention.

FIG. 2 shows the signal processing portion 3 in detail. An analog signal inputted into the signal processing portion 3 from the pulse amplifier 2 is converted to a digital signal in an A-to-D converter (hereinafter, referred to as the ADC) 31. The converted signal is inputted into an MCA function portion 32. The MCA function portion 32 is furnished with a pulse wave height analyzing function of outputting a radiation energy spectrum by measuring a peak wave height value of the signal inputted therein to allocate a channel corresponding to the measured wave height value and counting the wave height value channel by channel. The number of channels in the MCA function portion 32 corresponds to the wave height value of an analog pulse, that is, energy of γ rays.

Spectral information in the MCA function portion 32 is sent to a dose rate computation portion 34 and a mean energy computation portion 35. The spectral information sent to the dose rate computation portion 34 is subjected to processing to calculate a dose rate and a count rate on the basis of the spectral information outputted from the MCA function portion 32 and numerical values of the G(E) functions corresponding to the respective channels of the MCA function portion 32 and stored in a channel memory 33. Meanwhile, the spectral information sent to the mean energy computation portion 35 from the MCA function portion 32 is subjected to processing to calculate mean energy in the mean energy computation portion 35. Computation results of the dose rate computation portion 34 and the mean energy computation portion 35 are saved in the recording medium of the memory and display device 4 and displayed thereon.

By the processing in the signal processing portion 3, total radiation $\Delta R$ to which the G(E) function method is applied, total energy $\Delta E$ in a wave height range same as that of the total radiation, and a total count $\Delta N$ corresponding to the total energy are found in every computation period $\Delta T$ on the basis of the most recently inputted wave height spectral data. Further, the data thus found for a pre-set accumulation time $\Sigma_1\Delta T$ back from the current computation period is added up to find accumulated radiation $\Sigma_1\Delta R$, accumulated energy $\Sigma_1\Delta E$, and an accumulated count $\Sigma_1\Delta N$. With the use of these values found as above, targets as follows are computed:

dose rate $r_1=\Sigma_1\Delta R/\Sigma_1\Delta T$ mean energy $e_1$(average)$=\Sigma_1\Delta E/\Sigma_1\Delta N$ count rate $n_1=\Sigma_1\Delta N/\Sigma_1\Delta T$.

The mean energy computed in the mean energy computation portion 35 is utilized as a cause-determining material in a case where a dose rate rises. A rise in spatial dose rate is attributed to two reasons: one reason is that descendant nuclides of radon and thoron fall on the ground surface by rainfall and the other reason is influences from a reactor-related facility. In comparison with mean energy of spatial radiation at normal times, mean energy of radiation of descendant nuclides of radon and thoron is high whereas mean energy of radiation contributed by the reactor-related facility is low. Hence, when a dose rate rises, it becomes possible to provide accurate information as to which contribution is the cause of a rise by checking a variance of the mean energy.

As has been described, according to the first embodiment, the apparatus includes the signal processing portion 3 that computes a dose rate and mean energy on the basis of measured wave height spectral data and outputs the computation results, and the signal processing portion 3 computes the dose rate and the mean energy on the basis of the wave height spectral data in the same wave height range on the same time axis. It thus becomes possible to obtain a dose rate measuring apparatus with high accuracy.

Second Embodiment

A second embodiment of the invention will now be described. A dose rate measuring apparatus of the second embodiment is of the same configuration as the one shown in FIG. 1. The signal processing portion 3 in FIG. 1 described in the first embodiment above outputs the dose rate $r_1$, the mean energy $e_1$, and the count rate $n_1$. However, another computation method is added in the second embodiment.

A signal processing portion 3 shown in FIG. 3 will now be described. A signal outputted from the pulse amplifier 2 is converted to a digital signal in an ADC 31 and then accumulated in an MCA function portion 32 as spectral information. From the spectral information, a dose rate, mean energy, and a count rate are calculated using a first dose rate computation portion 341 and a first mean energy computation portion 351 by the same methods used in the dose rate computation portion 34 and the mean energy computation portion 35 in the first embodiment above.

The spectral information in the MCA function portion 32 is further added to a second dose rate computation portion 342 and a second mean energy computation portion 352. As in the same manner as in the first embodiment above, the second dose rate computation portion 342 and the second mean energy computation portion 352 find total radiation $\Delta R$ to which the G(E) function method is applied, total energy $\Delta E$ in a wave height range same as that of the total radiation, and a total count $\Delta N$ corresponding to the total energy in every computation period $\Delta T$ on the basis of the most recently inputted wave height spectral data.

In the second embodiment, on the basis of the data thus found, accumulated radiation $\Sigma_2 \Delta R$ is found by adding up the total radiation $\Delta R$ in the past from the current computation period until an accumulated value reaches or exceeds pre-set accumulated radiation. Then, accumulated energy $\Sigma_2 \Delta E$ is found by adding up total energy $\Delta E$ in the same wave height range in which the total radiation is found for an accumulation time $\Sigma_2 \Delta T$ back on the same time axis and an accumulated count $\Sigma_2 \Delta N$ is found by adding up the total count $\Delta N$ corresponding to the total energy. With the use of these values found as above, the following are computed:

dose rate $r_2 = \Sigma_2 \Delta R / \Sigma_2 \Delta T$ mean energy $e_2$(average)$= \Sigma_2 \Delta E / \Sigma_2 \Delta N$ count rate $n_2 = \Sigma_2 \Delta N / \Sigma_2 \Delta T$.

In the case of the computation method using the second dose rate computation portion 342 and the second mean energy computation portion 352, the dose rate $r_2$ and the accumulation time $\Sigma_2 \Delta T$ have an inversely proportional relation because the accumulated radiation is maintained constant. Hence, in the second embodiment, in addition to the advantage of the first embodiment above, a response becomes faster as radiation becomes higher. Accordingly, together with the data of mean energy, it becomes possible to quickly provide information on a rise in dose rate and a contribution to the rise.

Third Embodiment

Figure 4:
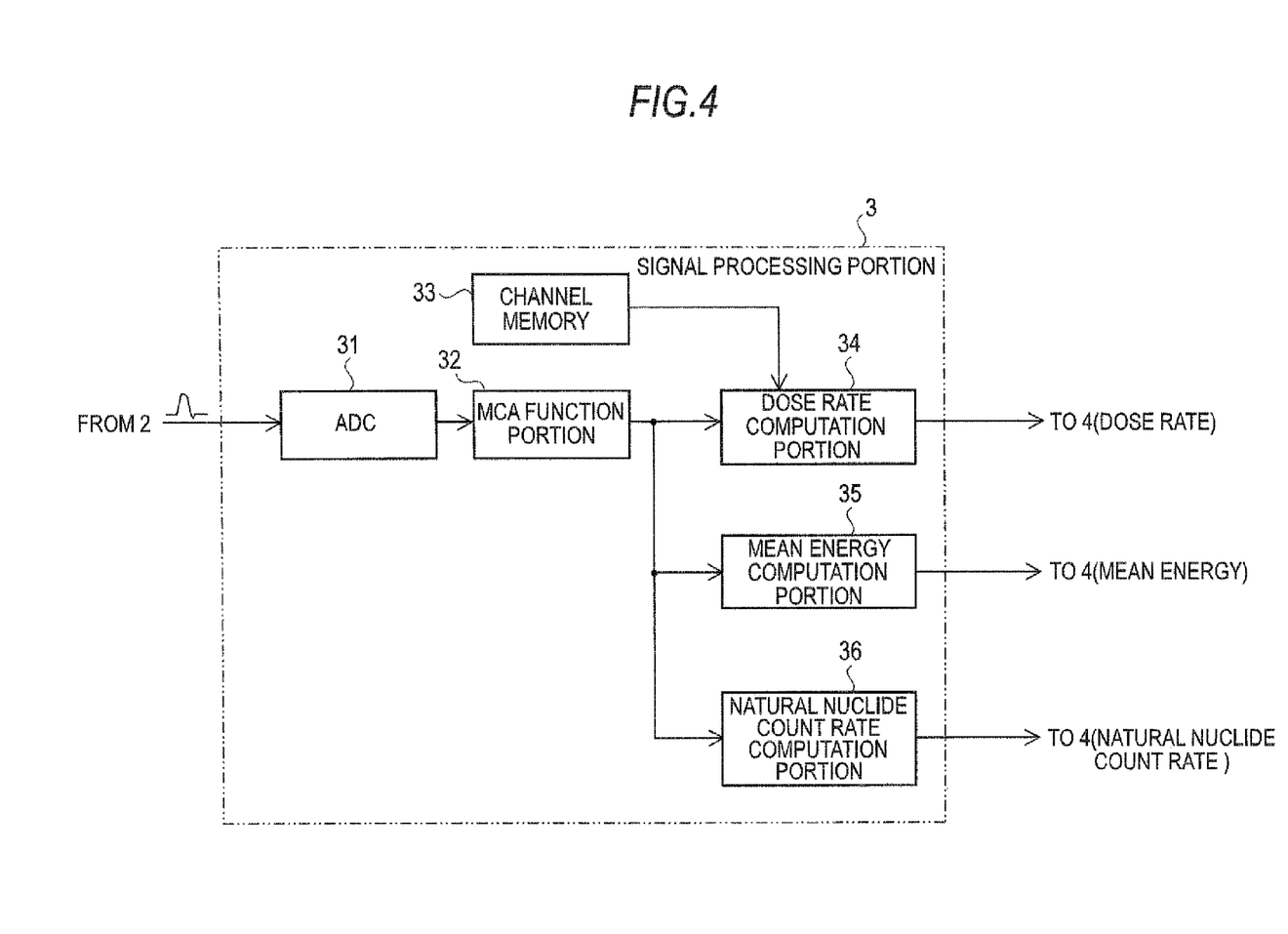
FIG. 4 is a block diagram of a signal processing portion of the dose rate measuring apparatus according to a third embodiment of the invention.

A third embodiment will now be described. A dose rate measuring apparatus of the third embodiment is of the same configuration as the one shown in FIG. 1. FIG. 4 shows a signal processing portion 3 of the third embodiment. The signal processing portion 3 shown in FIG. 4 converts an output of the pulse amplifier 2 to a digital form in an ADC 31. The converted signal is subjected to radiation energy spectral analysis in an MCA function portion 32 by allocating a channel corresponding to a wave height value and counting the wave height value channel by channel. On the basis of spectral information thus obtained and numerical values of the G(E) functions corresponding to the respective channels of the MCA function portion 32 and stored in a channel memory 33, a dose rate and mean energy are measured in a dose rate computation portion 34 and a mean energy computation portion 35, respectively, by the same methods as those used in the first embodiment above.

In the third embodiment, the apparatus further includes a natural nuclide count rate computation portion 36. This is a device that computes a count rate obtained by setting a window in an energy range specific to descendant nuclides of radon and thoron. Computation results of the respective computation portions are saved in the recording medium of the memory and display device 4 and displayed thereon.

According to the processing in the signal processing portion 3 of the third embodiment, as with the processing in the first embodiment above, total radiation $\Delta R$, total energy $\Delta E$ in a wave length range same as that of the total radiation, and a total count $\Delta N$ corresponding to the total energy are found in every computation period $\Delta T$ on the basis of most recently inputted wave height spectral data. Further, a total count $\Delta N_3$ of the radon and thoron descendant nuclide window is found in the natural nuclide count rate computation portion 36. Data for a pre-set accumulation time $\Sigma_1 \Delta T$ back from the current computation period is added up to find accumulated radiation $\Sigma_1 \Delta R$, accumulated energy $\Sigma_1 \Delta E$, an accumulated count $\Sigma_1 \Delta N$, and an accumulated count $\Sigma_1 \Delta N_3$. With the use of these values, the following are computed:

dose rate $r_1 = \Sigma_1 \Delta R / \Sigma_1 \Delta T$ mean energy $e_1$(average)$= \Sigma_1 \Delta E / \Sigma_1 \Delta N$ count rate $n_3 = \Sigma_1 \Delta N_3 / \Sigma_1 \Delta T$ According to this embodiment, by directly computing the window count rate $n_3$ in the energy range specific to descendant nuclides of radon and thoron in addition to the computation of the mean energy $e_1$, it becomes possible to provide more accurate information ensuring that a reduction of average energy is not attributed to a failure of the apparatus but to influences of radon and thoron.

Fourth Embodiment

Figure 5:
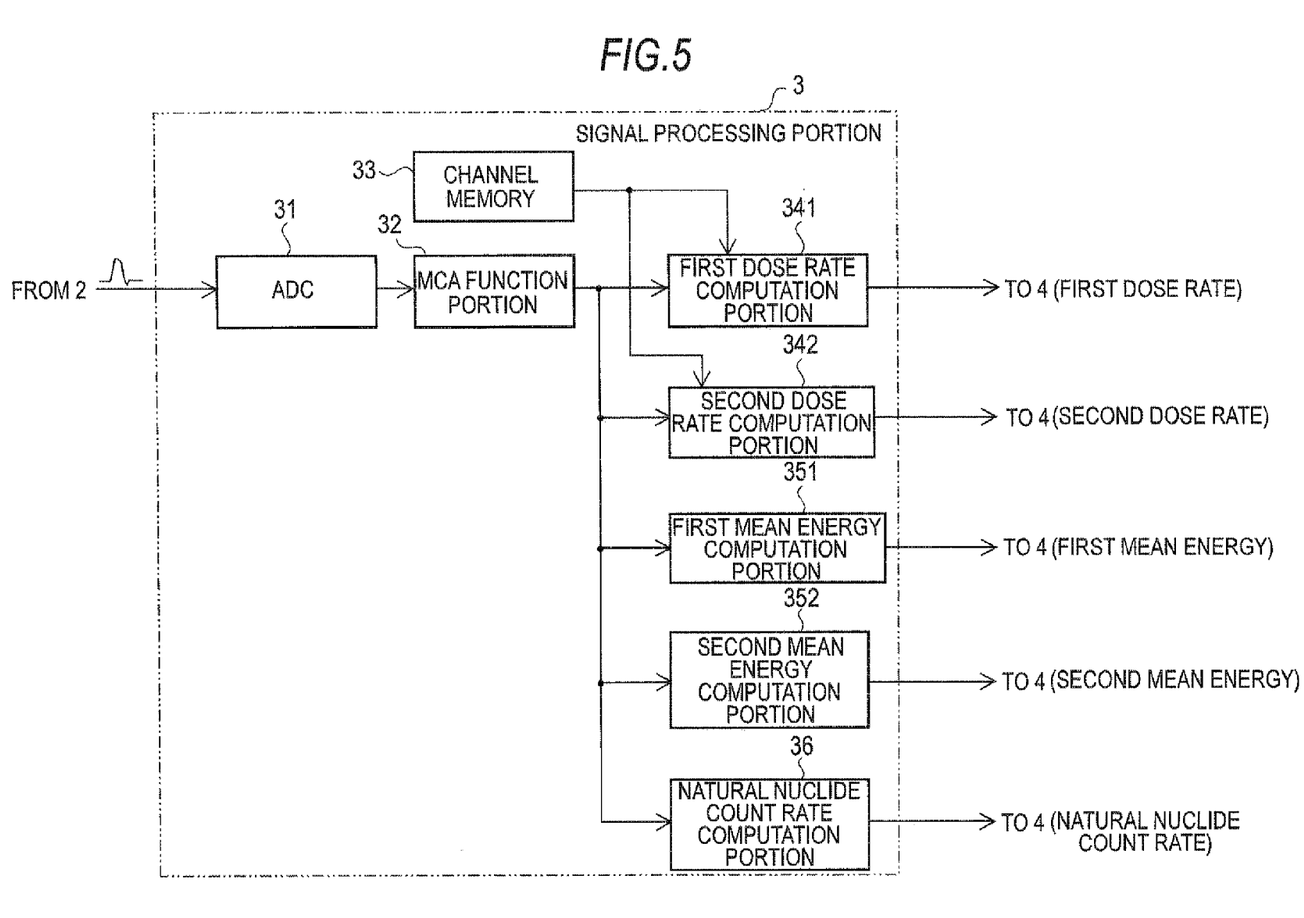
FIG. 5 is a block diagram of a signal processing portion of the dose rate measuring apparatus according to a fourth embodiment of the invention.

A fourth embodiment will now be described using FIG. 5. The fourth embodiment is a combination of the second embodiment and the third embodiment above. That is, the natural nuclide count rate computation portion 36 in the signal processing portion of FIG. 4 is added to the signal processing portion of FIG. 3.

Figure 3:
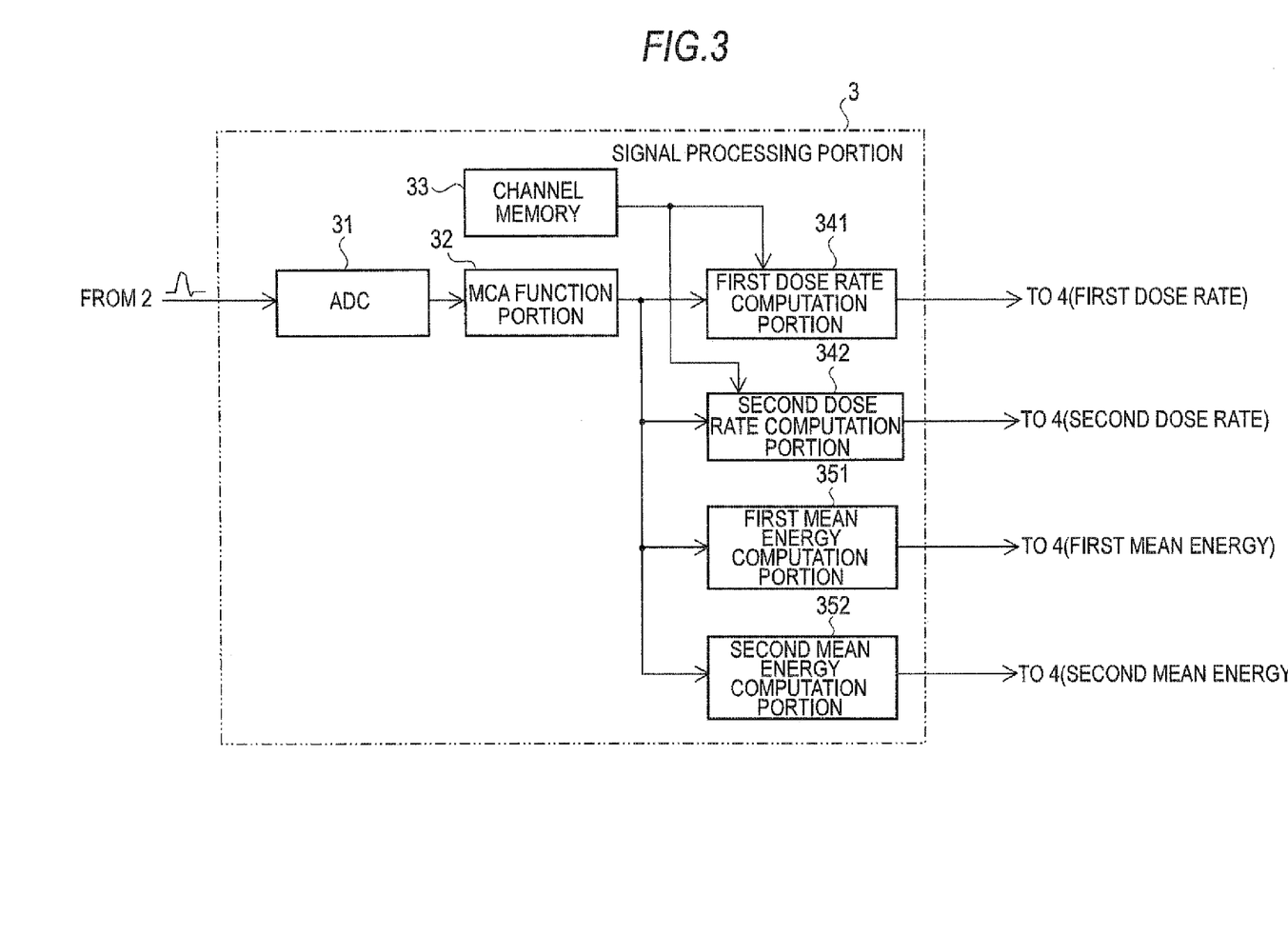
FIG. 3 is a block diagram of a signal processing portion of the dose rate measuring apparatus according to a second embodiment of the invention.

Operations of the signal processing of FIG. 3 and the signal processing of FIG. 4 are the same as those described in the second embodiment and the third embodiment above, respectively, and the description is not repeated herein.

According to the fourth embodiment, too, because accumulated radiation is maintained constant, it becomes possible to achieve a faster response as radiation becomes higher. Also, by measuring a variance of the mean energy and a count rate of the radon and thoron descendant nuclide window, it becomes possible to provide information on the basis of which to accurately determine whether a rise in dose rate is attributed to influences of rainfall or influences of a nuclear facility.

Fifth Embodiment

Figure 6:
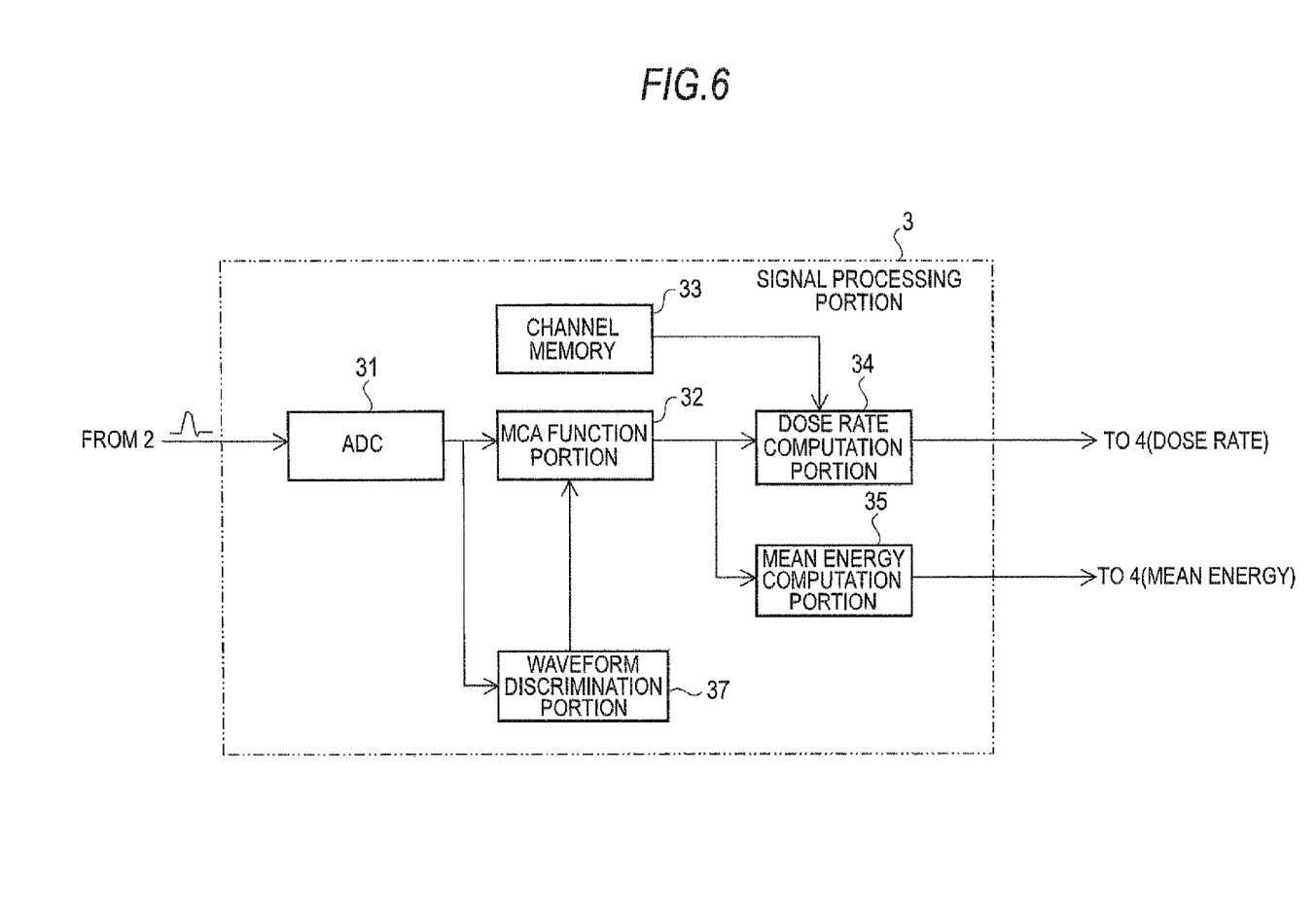
FIG. 6 is a block diagram of a signal processing portion of the dose rate measuring apparatus according to a fifth embodiment of the invention.

A fifth embodiment will now be described with reference to FIG. 6, FIG. 7, and FIG. 8. A dose rate measuring apparatus of the fifth embodiment is of the same configuration as the one shown in FIG. 1. In the fifth embodiment, as is shown in FIG. 6, a signal processing portion 3 is formed of the same components as those forming the signal processing portion shown in FIG. 2 except that a waveform discrimination portion 37 is added instead of the wave height measuring function furnished to the MCA functioning portion 32.

Figure 7:
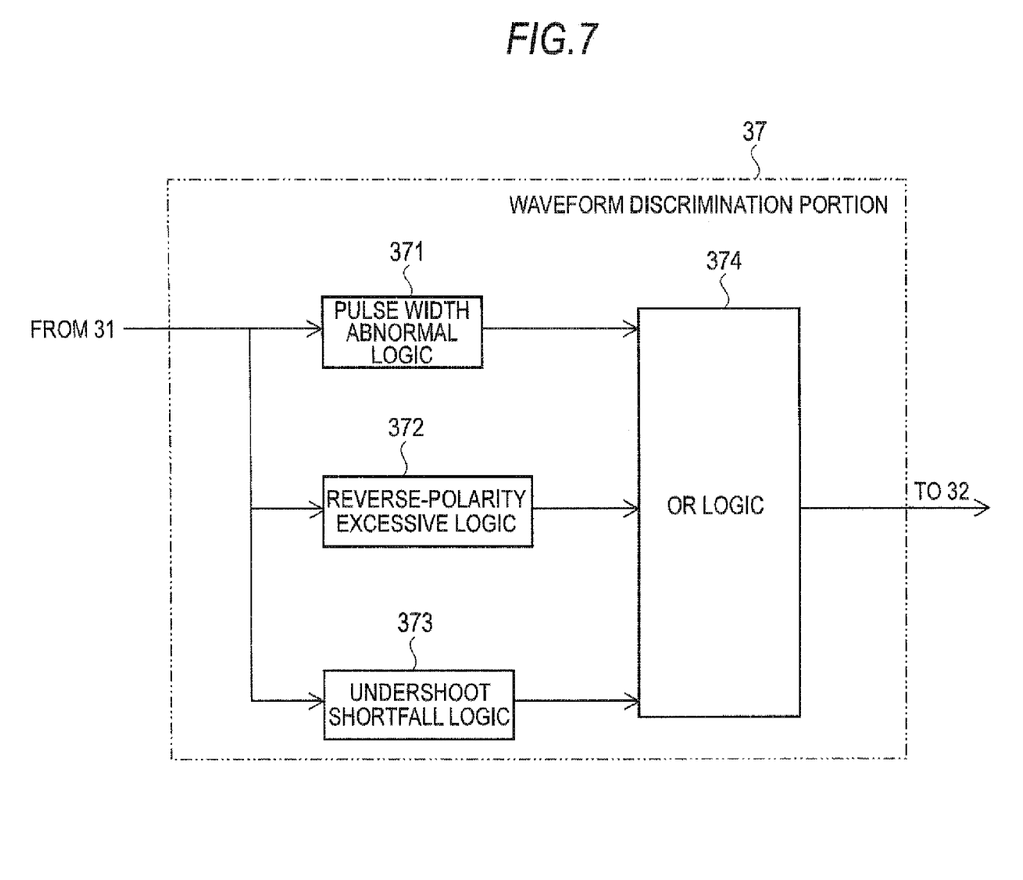
FIG. 7 is a block diagram of a waveform discrimination portion of the dose rate measuring apparatus according to the fifth embodiment of the invention.

As is shown in FIG. 7, the waveform discrimination portion 37 is formed of a pulse width abnormal logic 371, a reverse-polarity excessive logic 372, an undershoot shortfall logic 373, and an OR logic 374.

The radiation detector 1 absorbs energy of incident radiation and outputs an analog pulse having a wave height corresponding to the absorbed energy. The analog pulse is amplified and wave-shaped in the pulse amplifier 2 and then inputted into the signal processing portion 3. In the signal processing portion 3, the analog pulse is converted to a digital signal in an ADC 31 and inputted into the waveform discrimination portion 37 that measures a shape of a waveform that is, a wave height value and a pulse width of a pulse.

Figure 8:
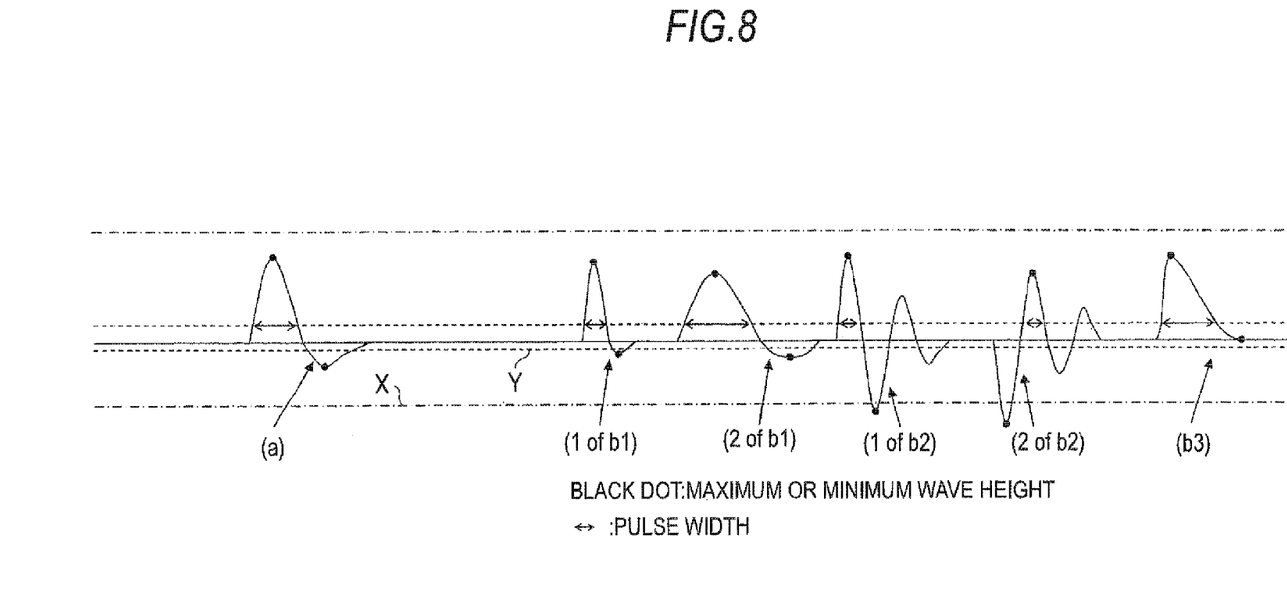
FIG. 8 is a waveform chart used to describe an operation of the dose rate measuring apparatus according to the fifth embodiment of the invention.

The pulse width abnormal logic 371 measures a pulse width of a signal inputted therein and determines a signal having a pulse width as wide as or narrower than a predetermined range in comparison with a signal ((a) of FIG. 8) generated by normal incident radiation as indicated by (1 of b1) of FIG. 8 or a signal having a pulse width as wide as or wider than the predetermined range as indicated by (2 of b1) as having an abnormal pulse width. The reverse-polarity excessive logic 372 determines a signal having a minimum wave height value exceeding a reverse-polarity reference level X as indicated by (1 of b2) and (2 of b2) of FIG. 8 as having an excessive reverse-polarity wave height. The undershoot shortfall logic 373 determines a signal having an undershoot that falls short of a reference level Y as indicated by (b3) of FIG. 8 as having an undershoot shortfall. The OR logic 374 outputs a digital pulse that is added to the MCA function portion 32 when there is an input from any one of the logics 371 through 373.

In a case where a digital pulse is outputted from the OR logic 374, the MCA function portion 32 determines that a waveform inputted therein is a noise and does not count this waveform. In this process, only a signal determined as being a signal generated by incident radiation is measured and the MCA function portion 32 generates an energy spectrum of incident radiation on the basis of the waveform data thus obtained. By applying the G(E) function method stored in the channel memory 33 to the energy spectrum, a dose rate and mean energy are computed in the dose rate computation portion 34 and the mean energy computation portion 35, respectively.

The device of the fifth embodiment is characterized in that the waveform discrimination portion 37 is provided between the ADC 31 and the MCA function portion 32 in any one of the first through fourth embodiments above. Hence, not only does it become possible to provide accurate information on a cause of a rise in dose rate with a quick response as in the first through fourth embodiments above, but it also becomes possible to classify input signals to a signal generated by incident radiation or a signal generated by a noise by discriminating waveforms. Consequently, it becomes possible to measure a dose rate, mean energy, and a count rate more accurately.

Various modifications and alterations of this invention will be apparent to those skilled in the art without departing from the scope and spirit of this invention, and it should be understood that this is not limited to the illustrative embodiments set forth herein.

What is claimed is:

1. A dose rate measuring apparatus, comprising:
   a radiation detector that outputs an analog pulse for incident radiation; and
   a signal processing portion including (i) a wave height measuring function for converting the analog pulse inputted therein to a digital form and measuring a peak wave height of the analog pulse, and (ii) a wave height spectrum measuring function for measuring a wave height spectrum on a basis of measured wave height data, computing a dose rate and mean energy on a basis of measured wave height spectral data, and outputting computation results,
   wherein the signal processing portion is configured to compute the dose rate on the basis of the measured wave height spectral data in a wave height range and over a specified period of time, and to compute the mean energy on the basis of the measured wave height spectral data over the same wave height range and specified period of time.

2. The dose rate measuring apparatus according to claim 1, wherein the signal processing portion includes:
   an ADC that converts the analog pulse to a digital form;
   an MCA function portion that is furnished with a pulse wave height analyzing function of outputting a radiation energy spectrum by allocating a channel corresponding to a wave height value inputted therein and counting the digital wave height value channel by channel;
   a channel memory that stores energy conversion factors corresponding to respective channels of the MCA function portion;
   a dose rate computation portion that computes a dose rate on the basis of the spectral information outputted from the MCA function portion and numerical values of the energy conversion factors; and
   a mean energy computation portion that computes mean energy on the basis of the spectral information outputted from the MCA function portion.

3. The dose rate measuring apparatus according to claim 1, wherein:
   on the basis of most recently inputted wave height spectral data and in every computation period $\Delta T$, the signal processing portion finds (1) total radiation dose $\Delta R$, (2) total energy $\Delta E$ in a wave height range same as that of the total radiation dose, and (3) a total count $\Delta N$ corresponding to the total energy, then adds up found data for an accumulation time $\Sigma_1 \Delta T$ set from a current computation period to find accumulated radiation dose $\Sigma_1 \Delta R$, accumulated energy $\Sigma_1 \Delta E$, and an accumulated count $\Sigma_1 \Delta N$, and computes and outputs a dose rate $r_1 = \Sigma_1 \Delta R / \Sigma_1 \Delta T$ and mean energy $e_1$ (average) $= \Sigma_1 \Delta E / \Sigma_1 \Delta N$.

4. The dose rate measuring apparatus according to claim 3, wherein the processing portion:
   computes and outputs the dose rate $r_1$ and the mean energy $e_1$,
   determines accumulated radiation dose $\Sigma_2 \Delta R$ by adding up the total radiation dose $\Delta R$ from the current computation period and successively previous computation periods until an accumulated radiation dose value reaches or exceeds a predetermined accumulated radiation dose value,
   determines accumulated energy $\Sigma_2 \Delta E$ by adding up the total energy $\Delta E$ in a same wave height range for an accumulation time $\Sigma_2 \Delta T$ which is the same as the period of time over which the accumulated radiation dose is determined, determines accumulated count $\Sigma_2 \Delta N$ by adding up the total count $\Delta N$ corresponding to the total energy, and computes and outputs a dose rate $r_2 = \Sigma_2 \Delta R / \Sigma_2 \Delta T$ and mean energy $e_2$ (average) $= \Sigma_2 \Delta E / \Sigma_2 \Delta N$.

5. The dose rate measuring apparatus according to claim 1, wherein:
the signal processing portion further includes a waveform discrimination portion configured to measure a wave height value and a pulse width of a received analog pulse.

6. A dose rate measuring apparatus, comprising:
a radiation detector that outputs an analog pulse for incident radiation; and
a signal processing portion that includes (i) a wave height measuring function of converting the analog pulse inputted therein to a digital form and measuring a peak wave height of the analog pulse, and (ii) a wave height spectrum measuring function of measuring a wave height spectrum on a basis of measured wave height data, computing a dose rate, mean energy, and a count rate obtained by setting a window specific to descendant nuclides of radon and thoron on a basis of measured wave height spectral data, and outputting computation results,
wherein the signal processing portion is configured to compute the dose rate on the basis of the measured wave height spectral data in a wave height range and over a specified period of time, and to compute the mean energy on the basis of the measured wave height spectral data over the same wave height range and specified period of time.

7. The dose rate measuring apparatus according to claim 6, wherein the signal processing portion includes:
an ADC that converts the analog pulse to a digital form;
an MCA function portion that is furnished with a pulse wave height analyzing function of outputting a radiation energy spectrum by allocating a channel corresponding to a digital wave height value inputted therein and counting the digital wave height value channel by channel;
a channel memory that stores energy conversion factors corresponding to respective channels of the MCA function portion;
a dose rate computation portion that computes a dose rate on the basis of the spectral information outputted from the MCA function portion and numerical values of the energy conversion factors;
a mean energy computation portion that computes mean energy on the basis of the spectral information outputted from the MCA function portion; and
a natural nuclide count rate computation portion that computes a count rate obtained by setting a window specific to descendant nuclides of radon and thoron and outputs the count rate.

8. The dose rate measuring apparatus according to claim 7, wherein:
on the basis of most recently inputted wave height spectral data and in every computation period $\Delta T$, the processing portion
finds (1) total radiation dose $\Delta R$, total energy $\Delta E$ in a wave height range same as that of the total radiation dose, (2) a total count $\Delta N$ corresponding to the total energy, and (3) a total count $\Delta N_3$ of the radon and thoron descendant nuclide window,
adds up found data for an accumulation time $\Sigma_1 \Delta T$ set from a current computation period to find accumulated radiation dose $\Sigma_1 \Delta R$, accumulated energy $\Sigma_1 \Delta E$, an accumulated count LAN, and an accumulated count $\Sigma_1 \Delta N_3$, and
computes and outputs a dose rate $r_1 = \Sigma_1 \Delta R / \Sigma_1 \Delta T$, mean energy $e_1$ (average) $= \Sigma_1 \Delta E / \Sigma_1 \Delta N$, and a count rate $n_3 = \Sigma_1 \Delta N_3 / \Sigma_1 \Delta T$.

9. The dose rate measuring apparatus according to claim 8, wherein the processing portion
computes and outputs the dose rate $r_1$ and the mean energy $e_1$,
determines an accumulated radiation dose $\Sigma_2 \Delta R$ by adding up the total radiation dose $\Delta R$ from the current computation period and successively previous computation periods until an accumulated radiation dose value reaches or exceeds a predetermined accumulated radiation dose value,
determines an accumulated energy $\Sigma_2 \Delta E$ by adding up the total energy $\Delta E$ in a same wave height for an accumulation time $\Sigma_2 \Delta T$ which is the same as the period of time over which the accumulated radiation dose is determined,
determines an accumulated count $\Sigma_2 \Delta N$ by adding up the total count $\Delta N$ corresponding to the total energy, and an accumulated count $\Sigma_2 \Delta N_3$ by adding up the total count $\Delta N_3$, and
computes and outputs a dose rate $r_2 = \Sigma_2 \Delta R / \Sigma_2 \Delta T$, mean energy $e_2$ (average) $= \Sigma 2 \Delta E / \Sigma_2 \Delta N$, and a radon and thoron descendant nuclide window count rate $n_3 = \Sigma_2 \Delta N_3 / \Sigma_2 \Delta T$.

* * * * *